Figure 1:
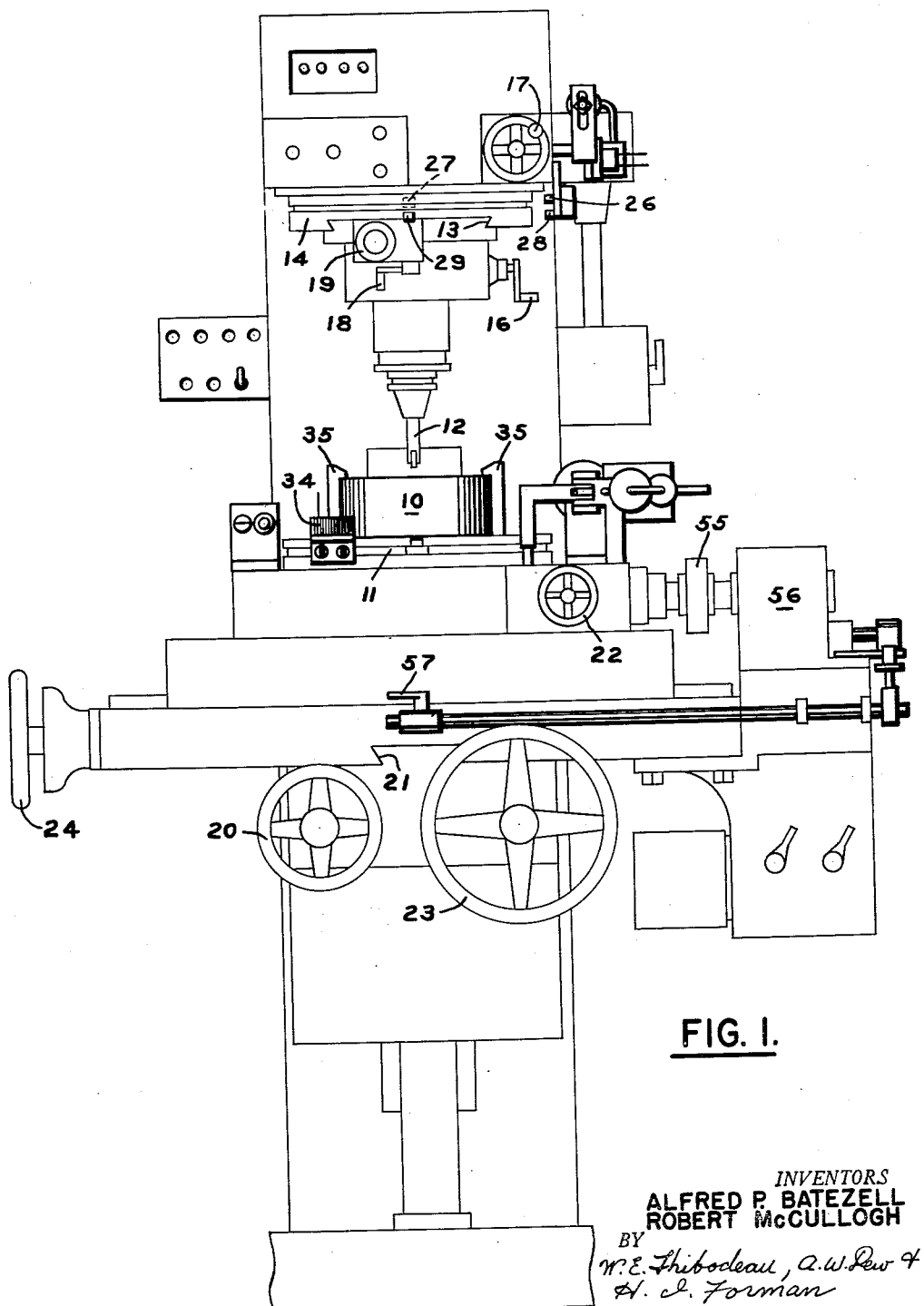

INVENTORS
ALFRED P. BATEZELL
ROBERT McCULLOGH

INVENTORS
ALFRED P. BATEZELL
ROBERT McCULLOGH
BY
W. E. Thibodeau, A. W. Dew & H. J. Forman
ATTORNEYS

United States Patent Office 3,015,994
Patented Jan. 9, 1962

3,015,994
APPARATUS FOR CUTTING AN ARCUATE VENTURI FOR RECOILLESS RIFLES
Alfred P. Batezell, Huntingdon Valley, and Robert Mc-Cullogh, Philadelphia, Pa., assignors to the United States of America as represented by the Secretary of the Army
Filed Mar. 30, 1956, Ser. No. 575,286
1 Claim. (Cl. 90—15)
(Granted under Title 35, U.S. Code (1952), sec. 266)

The invention described herein may be manufactured and used by or for the Government for governmental purposes without payment of any royalty thereon.

This invention relates to a method of an apparatus for cutting a recess having a curved side and end walls and has for an object to improve the shape of a hole being cut and make it approximate its intended shape more nearly than has heretofore been the practice. The specific products for which this invention is rovided are the kidney-shaped venturi openings found in the breech block of certain recoilless rifles.

Heretofore such venturi openings have had their side and end walls cut with the aid of a conical cutter shaping those walls to have the desired configuration, or as near as that objective can be accomplished, after one or more holes have been drilled all or part way through the material. This product has heretofore possessed several disadvantages. For one thing the venturi has not been cut in the precise shape intended. At the end of a side wall and at the beginning of an end wall cut, there has been a necessary period of dwell during which the conical cutter dug into the material more deeply than it would into the rest of the side walls. This has been due to an inherent flexure in the cutter axis with the result that, where the dwell occurred, the depth of cut was deeper than where it did not occur. Another objection has been that the side walls of the venturi were not always flat as the cone cutter would have its axis sloping during some parts of the cutter travel more than in other parts. A further objection prior to the cutting of these venturis has resided in the fact that the end walls require different degrees of slope to overcome the effect of the rifling in the gun barrel. It was slow work to adjust manually the slope of the cutter axis before beginning the cutting of each end wall. According to this invention these objections have been overcome and the finished product is enabled to be more nearly of its intended shape. To reduce the greater depth of cut at the end of a side wall and at the beginning of the cutting operation for an end wall, a single edged fly cutter is preferably used that cuts less depth of metal at one time and therefore is subjected to less flexure than is the axis of a cone cutter. Being subjected to less flexure of the cutter shaft during its operation upon the side walls, there is less reason for a greater depth of cut where any period of dwell may exist. Instead of having to tilt the cutter axis different amounts for the end walls, stops at each end of an end wall are connected for simultaneous adjustment in order that the length of one side wall may be started earlier by the same amount as the length of the opposite side wall is started later. The method and apparatus of this invention are made more nearly automatic so that the cutting of one wall may be initiated in response to the completion of a cutting of the previously cut wall.

Figure 2:
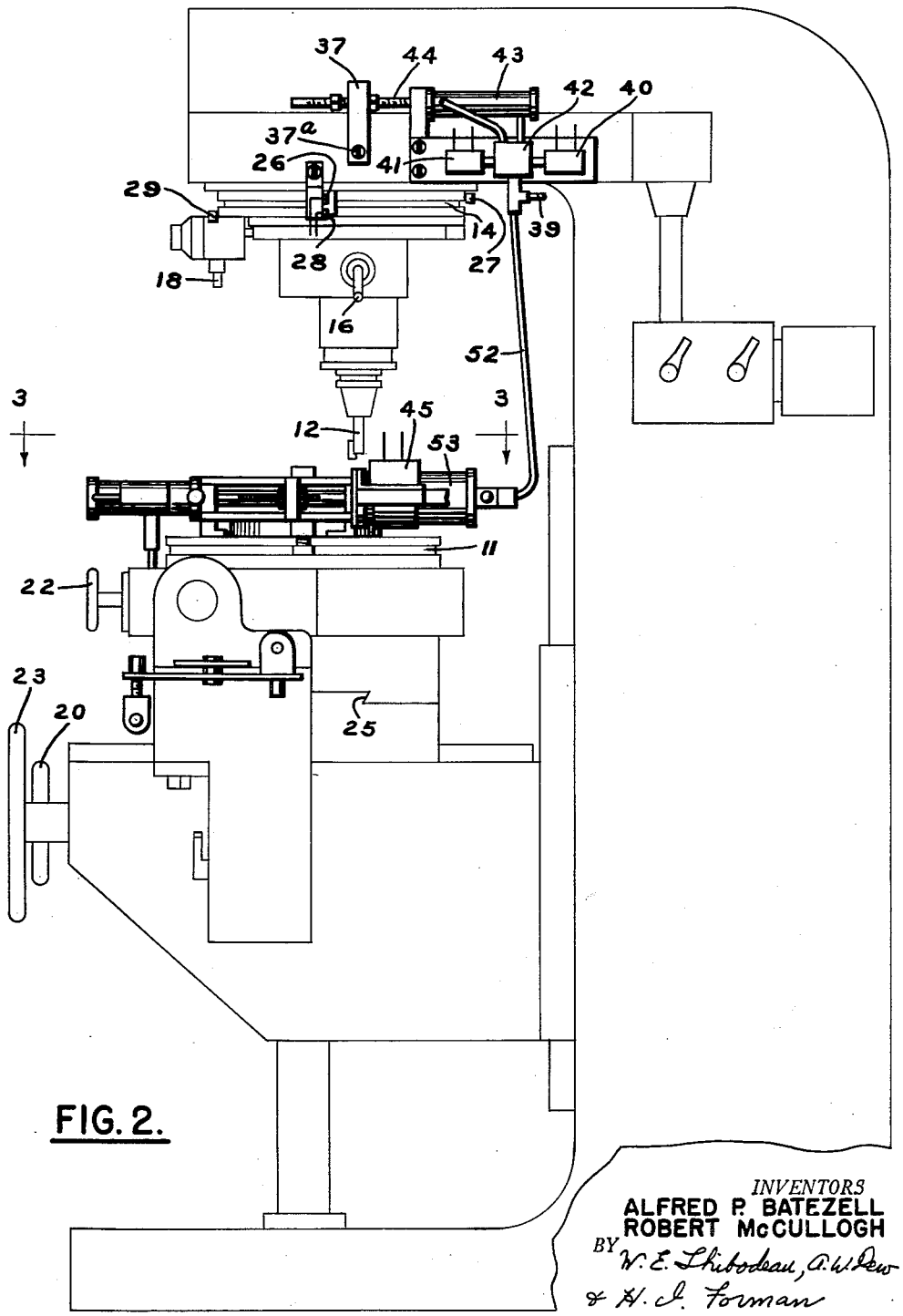
Figure 3:
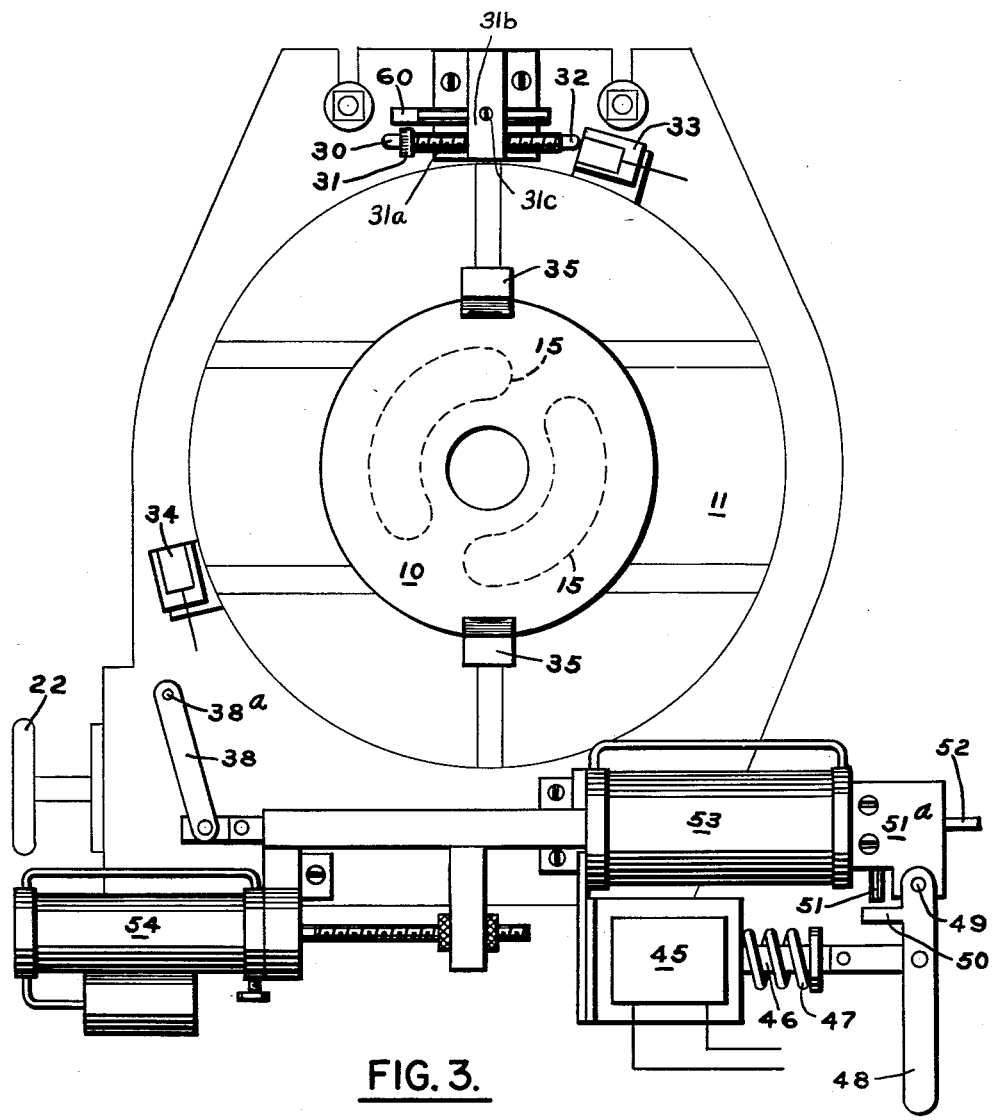
Figure 4:
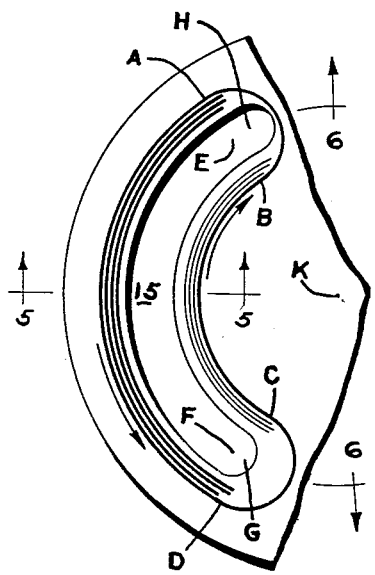
Figure 7:
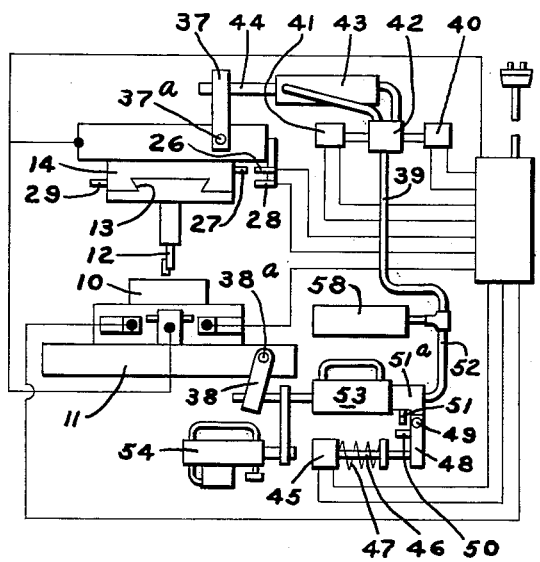
Figure 5:
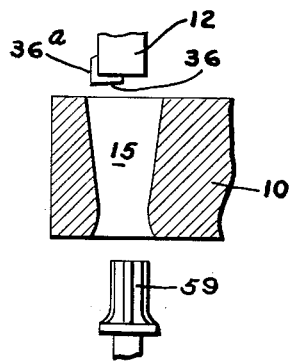
Figure 6:
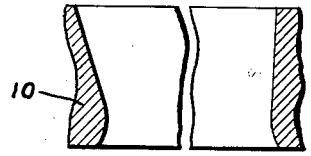

Referring to the drawings, FIG. 1 is a front elevation of a rotary head milling machine to which this invention has been applied. FIG. 2 is a side elevation of the device of FIG. 1. FIG. 3 is a top plan view of the turntable on the line 3—3 of FIG. 2. FIG. 4 is a top plan view of one of the venturis cut from the top of the work shown in FIG. 3. FIG. 5 is a section on the line 5—5 of FIG. 4. FIG. 6 is a section on the arcuate axial line 6—6 of FIG. 4. FIG. 7 is a partial diagram of the controls of the head and the turntable during the operation.

One product of this invention is shown in FIG. 4 in which a venturi opening of the shape illustrated is cut in breech block or other closure for a recoilless rifle. The inwardly sloping sides of the ends of the arcuate slot illustrated are purposely made dissimilar as to aid in counteracting the tendency to twist caused by the rifling of the gun barrel.

The machine is a milling machine of the sort in which the cutting tool is rotated simultaneously about two different axes in the head. One such axis is the longitudinal axis of the cutter shaft and the other is an axis outside the cutter shaft about which the cutter axis rotates while forming the ends of the venturi illustrated. The longitudinal sides of this venturi are formed by rotating the turntable about its axis. The machine is a Kearny-Trecker model 2d type milling machine to which additions have been made under the present invention.

Referring to FIGS. 1 and 2 the workpiece 10 is secured to the turntable 11 of this milling machine and to which additions have been made under the present invention. The fly cutter illustrated is carried by the rotatable shaft 12 driven through the head 14 so that the axis of the cutter shaft 12 may be rotatable about an axis displaced from its own axis. This is accomplished by means of the dove-tailed slot 13 in the head along which the cutter and the driving mechanism may be adjusted. The arcuate or kidney-shaped opening or slot 15 is cut one at a time although there are two such openings to be cut in the workpiece as shown in FIG. 3. The usual handle 18 permits adjustment of the cutter longitudinally of the dove-tail slot 13 for controlling the radius of curvature at the ends of the venturi 15. A graduated dial 19 assists an operator in the manual longitudinal adjustment of the head in order that the increments of movement by the handle 18 may be made equal or of different magnitudes as desired. The handle wheel 17 permits manual rotation of the head so that the same may be put into whatever position of adjustment is desired. By means of the handle 16 the vertical position of head adjustment is controlled so that the tool may be moved up or down as desired. The turntable 11 is adjustable in position along the dove-tailed slot 21 by the hand wheel 20. A hand wheel 22 (FIGS. 1 and 2) permits manual rotation of the turntable. Vertical adjustment upwardly or downwardly of the desired amount is accomplished by the hand wheel 23. Adjustment along the turntable longitudinally of the second dove-tailed slot 25 is accomplished by the hand wheel 24.

As shown in the upper portion in FIG. 1, the head 14 carries contacts 27 and 29 which are adapted to engage stationary contacts 26 and 28 respectively, the movable contacts 27 and 29 being angularly separated by substantially 180°.

As shown in FIG. 3 stationary contact and stop elements 30 and 32 are connected together through a threaded stem rotatable or adjustable by the scale 31 shown at the top of FIG. 3. The turntable carries combined electrical contacts and mechanical stops 33 and 34 spaced apart about as illustrated. Customary work clamps 35 secure the workpiece 10 in poistion on the turntable 11. The fly cutter shown in FIG. 5 has a cutting edge 36 on a bottom side and also on a vertical side 36ª.

In the upper portion of FIGS. 2 and 7 is the lever 37 which is movable about its pivot 37a for operating a conventional gear shift mechanism for starting and stopping rotation of the head 14. While this gear shift is adapted to rotate the head 14 in either direction, its use in the cutting of a venturi requires only one direction of rotation. Movement of the lever 37 to the left from its vertical position starts rotation of the head in a clockwise direction and the return movement of this lever 37 to the vertical position illustrated stops rotation of the head. In cutting the venturi opening shown, it is not necessary for the head to rotate in any other way than in a clockwise direction. As shown in these same FIGS. 2 and 7 a supply pipe 39 leads from some source of compressed air for the automatic starting and stopping of the head and the turntable. The turntable is rotated in a clockwise direction when its lever 38 (FIGS. 3 and 7) is moved about its pivot 38a to a position as shown in FIG. 7. Moving the lever 38 in the opposite direction, to the position shown in FIG. 3, causes the turntable to rotate in a counterclockwise direction as viewed in FIG. 3. These movements of the turntable are effected through a reversing gear mechanism to which the lever 38 is pivoted at the point 38a.

Compressed air through the pipe 39 enters the valve housing 42 (FIGS. 2 and 7) and then according to the position of the control valve therein supplies compressed air to either the right or left end of the cylinder 43 for movement of the piston rod therein to the right or to the left according to whether the head is to be stopped or started. For starting the head the solenoid 41 is energized, moving the valve in the housing 42 to a position closing the pipe to the left end of cylinder 43. This movement also exposes the pipe to the right end so that the compressed air is admitted at the right end of the cylinder 43 for moving the lever 37 from its upright position shown in FIG. 7 to the left of such upright position shown in the same figure. On energizing the solenoid 40 the valve within the housing 42 is moved to the right closing the pipe leading to the right end of the cylinder 43 and opening the pipe leading to the left end of the same cylinder so that compressed air may enter the cylinder and move the piston rod 44 to the right, moving the lever 37 to its FIG. 7 position, stopping rotation of the head.

On energizing the solenoid 45 shown in the lower portion of FIGS. 3 and 7, its armature 46 is moved to the left, compressing spring 47. This causes the lever 48 to move to the left about its pivot 49, causing the projection 50 to raise the valve stem 51 admitting compressed air from the pipe 52, to the cylinder 53. This admittance of compressed air moves the cylinder's piston toward the left, thus shifting the lever 38 from the position shown in FIG. 3 to that shown in FIG. 7, when the turntable will be rotated in a counterclockwise direction. The buffer cylinder 54 is for the purpose of cushioning and slowing up the otherwise too rapid movement of the piston in cylinder 53 so that its movement may be slow enough for the safe shifting of gears controlling the direction of rotation of the turntable. After the turntable has been started, the power drive is through a clutch 55 (FIG. 1) from the reducing gearing 56. When the turntable is stopped by one of the contacts 34 or 33 reaching an end of its travel, the clutch 55 slips, allowing the turntable to stop and the head to be started for driving the cutting tool around a semicircular end of the venturi. Where the turntable may not be in a desired position to begin with, it may be adjusted by means of the manual control 57 (FIG. 1) which may also shift the gears within the housing 56 of the reducing gears. The compressed air cylinder 58 (FIG. 7) supplies the compressed air for actuation of the pistons within the cylinders 43 and 53. After the head has rotated 180° to an end of its travel, its stops causing the head to cease rotation and at the same time cause the turntable to reverse its direction. This is accomplished by de-energizing solenoid 45, allowing the spring 47 to move the lever 48, permitting the valve stem 51 to be moved downwardly under compression of a spring within the valve housing 51a, and allowing compressed air to be admitted to the left end of the cylinder 53 for shifting the piston and lever 38 from the position shown in FIG. 7 to that shown in FIG. 3 when the table will rotate in a clockwise direction.

After the fly cutter has cut the slot 15 to the depth desired the lower end of the slot is usually made by cutting at least one hole entirely through the workpiece 10 and then starting the form cutter 59 (FIG. 5) through that hole and moving it around the periphery of the venturi to give the side walls shown in FIGS. 5 and 6 their curvature as illustrated. For this last operation the workpiece may be turned over and the form cutter 59 carried by the head.

To assist an operator in accurately controlling the adjustment of the connected stops 30 and 32 for the turntable, the graduated wheel 31 (FIG. 3) on the shaft connecting these stops is caused to pass close to the reference projection 60 in order that precision of adjustment may be obtained. Of course, if desired the projection 60 may have an edge capable of engaging a shallow groove formed transversely on the periphery on the wheel 31 for holding the wheel in a given adjustment.

If it be imagined that the fly cutter begins operation at the position A in FIG. 4, then on starting the machine, solenoid 41 will be actuated driving the piston 44 and the lever 37 to the left from the position shown in FIG. 7, starting rotation of the head in a clockwise direction. At this time the stop 33 will be in contact with stop 32 causing any previous motion of the turntable to stop, allowing the clutch 55 to slip during the rotation of the head for cutting an end of the venturi as the axis of the fly cutter is moved about a center E. On reaching the point B the movable contact 27 carried by the head will have been moved 180° to contact with the stationary contact 26. Upon such contact the solenoid 40 is energized admitting compressed air to the left end of cylinder 43 moving the piston rod 44 and the lever 37 to the right until the lever is in an upright position as illustrated in FIG. 7 when rotation of the head ceases. Simultaneously with the energizing of the solenoid 40, the solenoid 45 which had been previously energized will be de-energized allowing its spring 47 to move the lever 48 to the right into a downwardly extending position shown in FIG. 3. This will allow the valve stem 51 to be displaced by a spring within the housing 51a, admitting compressed air to the left end of the cylinder. This serves to shift lever 38 from the position shown in FIG. 7 to the position shown in FIG. 3 when rotation of the turntable begins in a clockwise direction, moving the workpiece 10 past the rotating fly cutter, the turntable moving about the point K as a center until the tool reaches the point C.

Upon reaching the point C the stop end contact 34 carried by the turntable will have reached the contact 30. Upon the contacts 30 and 34 engaging, rotation of the turntable ceases while its clutch slips and solenoid 41 is energized, admitting compressed air to the right end of cylinder 43 and moving the lever 37 to the left, starting rotation of the head again in a clockwise direction for moving the cutter axis in a semicircle about the center G until reaching the point D. Here again the head contacts 28 and 29 will have become engaged to energize the solenoid 40, admitting compressed air to the left end of the cylinder 43 and moving the lever 37 from its operating to its upright position when rotation of the head ceases. Simultaneously with suspension of rotation of the head, the solenoid 45 is energized, moving its armature 46 to the left, compressing spring 47, moving lever 48 to the left from the position shown in FIG. 3 when the projection 50 engages the valve stem 51, and admitting air into the right end of the cylinder 43 causing its piston rod to shift the lever 38 to the position shown in FIG. 7 when rotation of the turntable begins in a counterclockwise direction. Such movement of the turntable continues until the cutting tool reaches the point A. At this time movement of the turntable ceases, its clutch slips, and movement of the head again starts repeating the cycle of operations previously described. Thus, movement of either the turntable or the head to a position in which contacts engage causing rotation of that moving element to cease and rotation of the other element, namely the head or turntable, to begin its movement. As mentioned above, movement of the head is always in a clockwise direction in cutting the ends of the venturi illustrated but movement of the turntable is in a clockwise direction for cutting a longitudinal side of the venturi slot from point B to point C in FIG. 4 and in a counterclockwise direction in cutting the opposite longitudinal side of such slot or opening from point D to point A.

At a time preferably during cutting of one of the longitudinal sides of the venturi the depth of the cut is increased and preferably this increase in depth of cut is made uniform as the fly cutter advances into the work. This increase in depth of cut is made preferably by movement of the handle 18 for lowering the fly cutter into the work although the same result will be obtained by raising the turntable. In one embodiment of this invention it has been found that an increase in depth made in increments of .008 inch was regarded as appropriate. Each time the cutting tool has made a complete circuit of the work from A through the points B, C, D and back to A, the stops 30 and 32 are adjusted so that the clockwise movement of the turntable ends earlier as the tool descends into the work. This means that the clockwise movement of the turntable will begin earlier by the same amount that its counterclockwise movement was lengthened. Thus the end of the clockwise movement of the turntable, when the tool is moved from the point B to C, results in the clockwise movement ceasing earlier and the counterclockwise movement beginning as the point D ends later. Thus, as the tool descends into the work, the center of rotation of the head is in effect gradually moved from the point E to the point H as shown in FIG. 4, and such center of rotation of the other end of the venturi is moved similarly from the point G to the point F. The distance between these points E and H and between the points G and F are equal because each time the position of stops 30 and 32 are adjusted the movement of the stop 33, for example, occurs earlier by the same amount that the stop 34 occurs later in engaging the contact 30. In one embodiment it was found that an adjustment of the stops 30 and 32 by an increment of .001 inch per cycle was satisfactory. The approximately 7° angle to the sides of the slots shown in FIG. 5 was increased and decreased in FIG. 6 approximately by equal amounts of about 5° so that the cutter caused the upper end of the slot in FIG. 4 to be about 2°, and the slope of the lower end of the slot in FIG. 4 to be about 12°.

Among the advantages of this invention may be mentioned the facts that the fly cutter in the present case cuts a small depth of cut, does not have to have its axis dwell in cutting the ends of the slot, and, when the increase in depth of cut is made small, produces a substantially flat surface instead of a stepped appearance that might result were the cuts of larger increments. Also, the cutter shaft is subjected to less flexure than would be the case were a cone or form cutter used at the ends of the slot. The resulting venturi opening is more nearly of the configuration desired. The adjustment of the handles 16 and 18 and the adjustment of the connected stops 30 and 32 are preferably made during the cutting of a longitudinal side wall of the venturi because, during the cutting of an end wall, one or the other of the turntable stops are in contact with their stationary stops and it is found that the adjustment of the cutting tool is easier at such times. This adjustment of the turntable stops and the vertical adjustment of the cutter into the work at each cycle may be made either manually or automatically upon completion of the cutting of an end portion. Also if desired, time may be saved by having a sequence of operations described above electronically controlled, but such is believed to be within the skill of the art and is not a part of the present invention. When the workpiece 10 has been turned over for operation of the form cutter 59, that part of the work is preferably performed manually, though it may be done automatically. When this form cutter 59 is used for finishing the uncut part of the work it is not necessary to cause any change in adjustment on the turntable stops 30 or 33 as that cutter enters the work.

We claim:

In a machine for cutting a kidney shaped venturi opening in a workpiece, said machine comprising a rotatable turntable, a bed below said turntable, a rotatable cutter movable relatively toward and from said turntable for operation on a workpiece fixed to said turntable, a rotatable head for moving said cutter in an arcuate path for cutting end walls of said venturi opening, means for rotating said cutter substantially continuously, means for rotating said turntable for cutting one longitudinal curved side of a venturi opening and for rotating the turntable in an opposite direction for cutting an opposite longitudinal side of substantially the same angular extent past the rotating cutter, means responsive to completion of a longitudinal arcuate cut at one side of said venturi opening for stopping the turntable and starting said rotating head through substantially a semicircle, means for stopping rotation of said head at the finish of said semicircular rotation and starting the rotation of said turntable in the opposite direction to the previous movement of said turntable for starting cutting the opposite longitudinal arcuate cut, means for adjusting the cutter with respect to a workpiece for cutting inclined sides and ends for a venturi, the combination therewith of the improvement for reducing the number of adjustments needed when the ends of said venturi opening are given different slopes from each other and from the longitudinal side walls, said improvement including means stopping the rotation of said turntable relative to the center of head rotation toward one end of said cut by substantially the same amount said turntable is rotated relative to said center of head rotation to the opposite end of said cut, said last mentioned means comprising a fixed support mounted on said bed, a threaded stem held in threaded adjustable engagement therewith and having ends projecting on each side of said support so that in adjusting said threaded stem the adjustment is added to one end and subtracted from the other end in determining the arcuate cut, and a stop on said turntable on each side of said support for engaging the ends of said threaded stem respectively for stopping movement of said turntable at each end of said arcuate cut.

References Cited in the file of this patent
UNITED STATES PATENTS

| | | |
|---|---|---|
| 1,707,219 | Cook | Apr. 2, 1929 |
| 2,365,078 | Hoier | Dec. 12, 1944 |
| 2,379,870 | Barker | July 10, 1945 |
| 2,398,268 | Wilson | Apr. 9, 1946 |
| 2,564,613 | Seborg et al. | Aug. 14, 1951 |
| 2,605,677 | Armitage | Apr. 5, 1952 |
| 2,876,669 | Pettgrew | Mar. 10, 1959 |